(12) United States Patent
Hosein et al.

(10) Patent No.: US 11,673,093 B2
(45) Date of Patent: Jun. 13, 2023

(54) ELECTRO-CONTROLLABLE ION EXCHANGE MEMBRANE

(71) Applicants: Ian Hosein, Minoa, NY (US); Fu-Hao Chen, Syracuse, NY (US)

(72) Inventors: Ian Hosein, Minoa, NY (US); Fu-Hao Chen, Syracuse, NY (US)

(73) Assignee: Syracuse University, Syracuse, NY (US)

(*) Notice: Subject to any disclaimer, the term of this patent is extended or adjusted under 35 U.S.C. 154(b) by 0 days.

(21) Appl. No.: 16/226,774

(22) Filed: Dec. 20, 2018

(65) Prior Publication Data

US 2019/0193029 A1    Jun. 27, 2019

Related U.S. Application Data

(60) Provisional application No. 62/608,179, filed on Dec. 20, 2017.

(51) Int. Cl.
| | | |
|---|---|---|
| *B01D 61/44* | (2006.01) | |
| *B01D 69/02* | (2006.01) | |
| *H01M 8/10* | (2016.01) | |
| *H01M 8/18* | (2006.01) | |
| *C08J 5/00* | (2006.01) | |
| *B01D 61/42* | (2006.01) | |

(52) U.S. Cl.
CPC ........... *B01D 61/445* (2013.01); *B01D 69/02* (2013.01); *C08J 5/00* (2013.01); *H01M 8/10* (2013.01); *H01M 8/188* (2013.01); *B01D 61/422* (2013.01); *B01D 2313/365* (2013.01); *B01D 2325/26* (2013.01); *B01D 2325/42* (2013.01)

(58) Field of Classification Search
CPC ..................................................... C02F 1/4691
See application file for complete search history.

(56) References Cited

U.S. PATENT DOCUMENTS

| | | | |
|---|---|---|---|
| 2002/0167782 A1* | 11/2002 | Andelman | C02F 1/008 361/302 |
| 2003/0077515 A1* | 4/2003 | Chen | H01M 4/364 429/231.8 |
| 2006/0291139 A1* | 12/2006 | Nedoshivin | H01G 11/30 361/502 |
| 2008/0121531 A1* | 5/2008 | Anderson | C02F 1/4691 204/252 |
| 2014/0158527 A1* | 6/2014 | Chung | B05D 7/584 204/263 |
| 2016/0261005 A1* | 9/2016 | Rustomji | H01G 11/60 |
| 2017/0001188 A1* | 1/2017 | Choi | C08L 33/26 |
| 2018/0236372 A1* | 8/2018 | Govindan | B01D 61/08 |

* cited by examiner

*Primary Examiner* — Salil Jain
(74) *Attorney, Agent, or Firm* — David Nocilly

(57) ABSTRACT

A conductive nanoporous membrane system has a first ion exchange membrane formed from a nanoporous substrate that is coated with a metal or carbon or conductive polymers to form a conductive membrane, a second ion exchange membrane that is also formed from a nanoporous substrate coated with a metal to form a conductive membrane is positioned in spaced relation to the first conductive membrane and coupled to a voltage source; the negatively potential membrane acts as a cation exchange membrane in the presence of an electrolyte, and the positively connected electrode behave as anodic exchange membrane in the presence of an electrolyte due to the formation of electrical double layers at the interface between metal and liquid electrolyte.

12 Claims, 8 Drawing Sheets

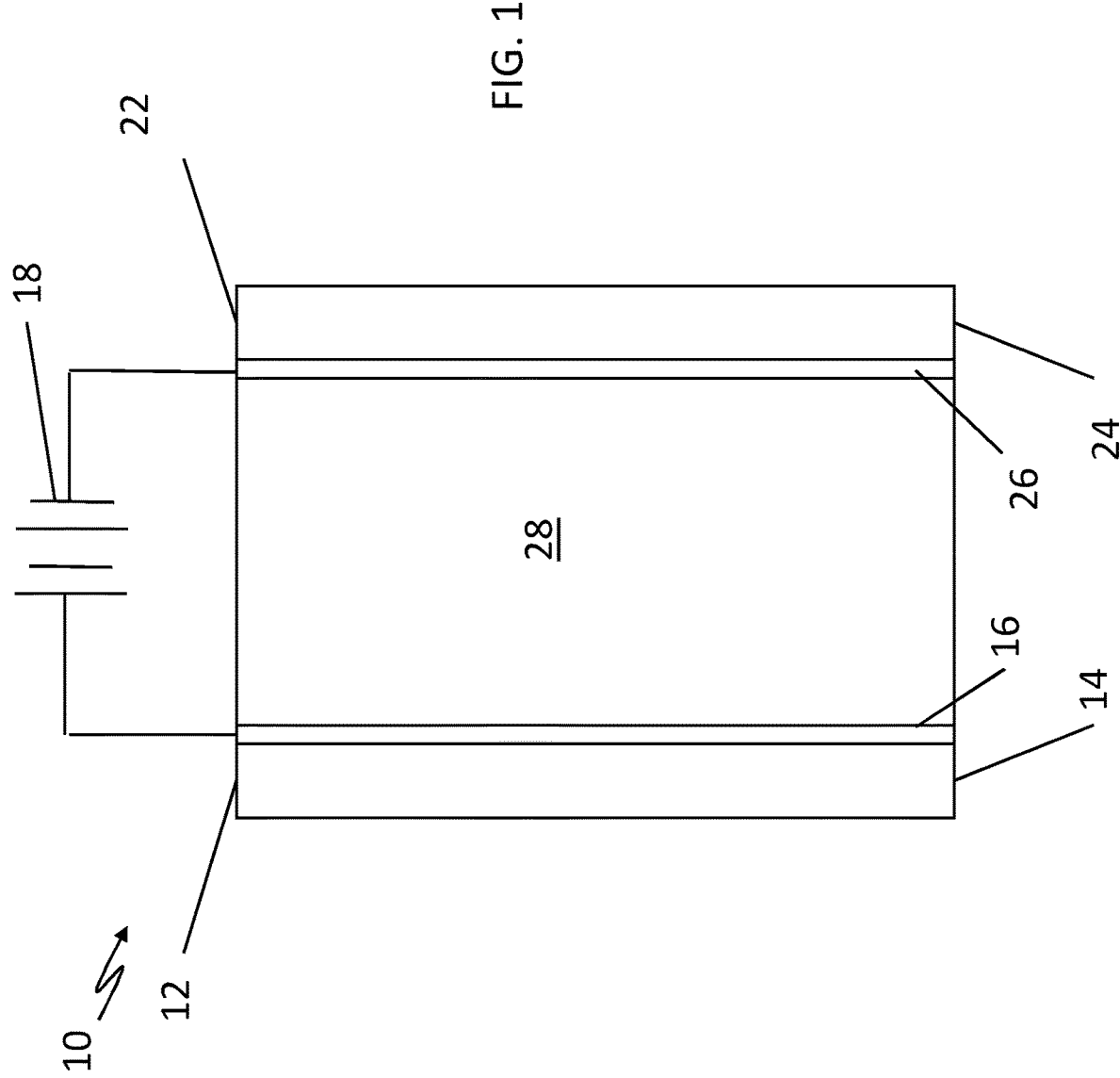

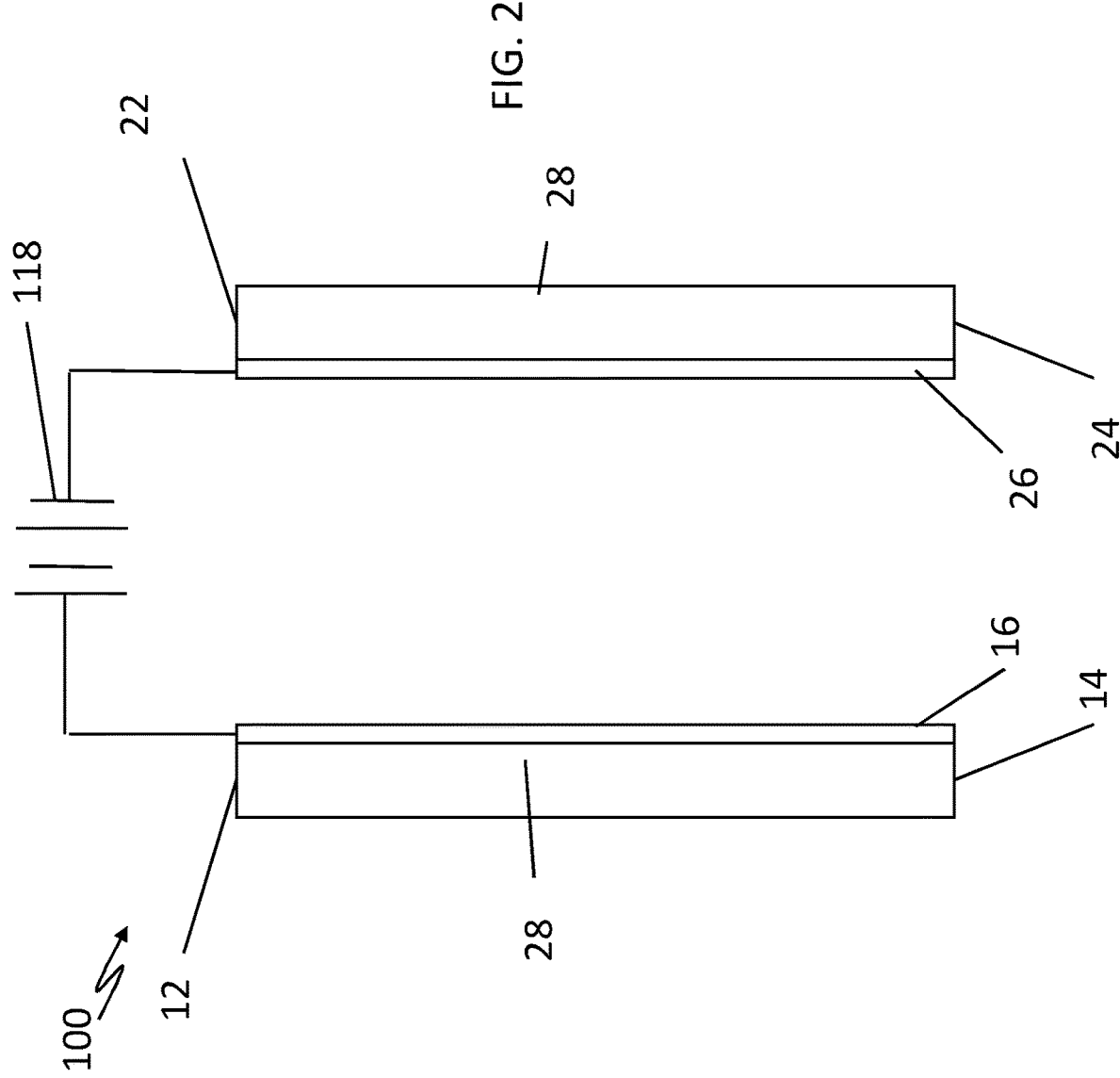

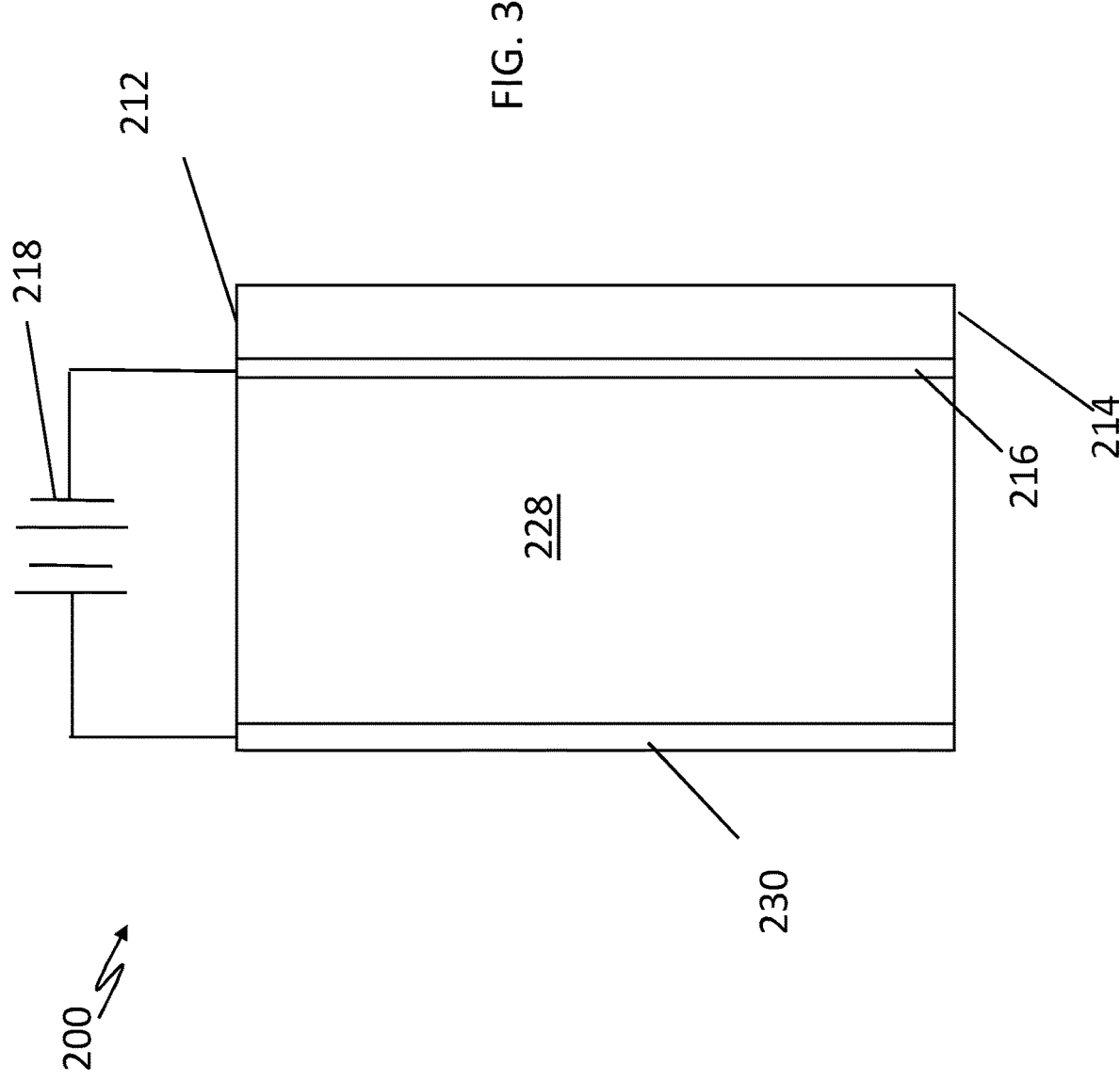

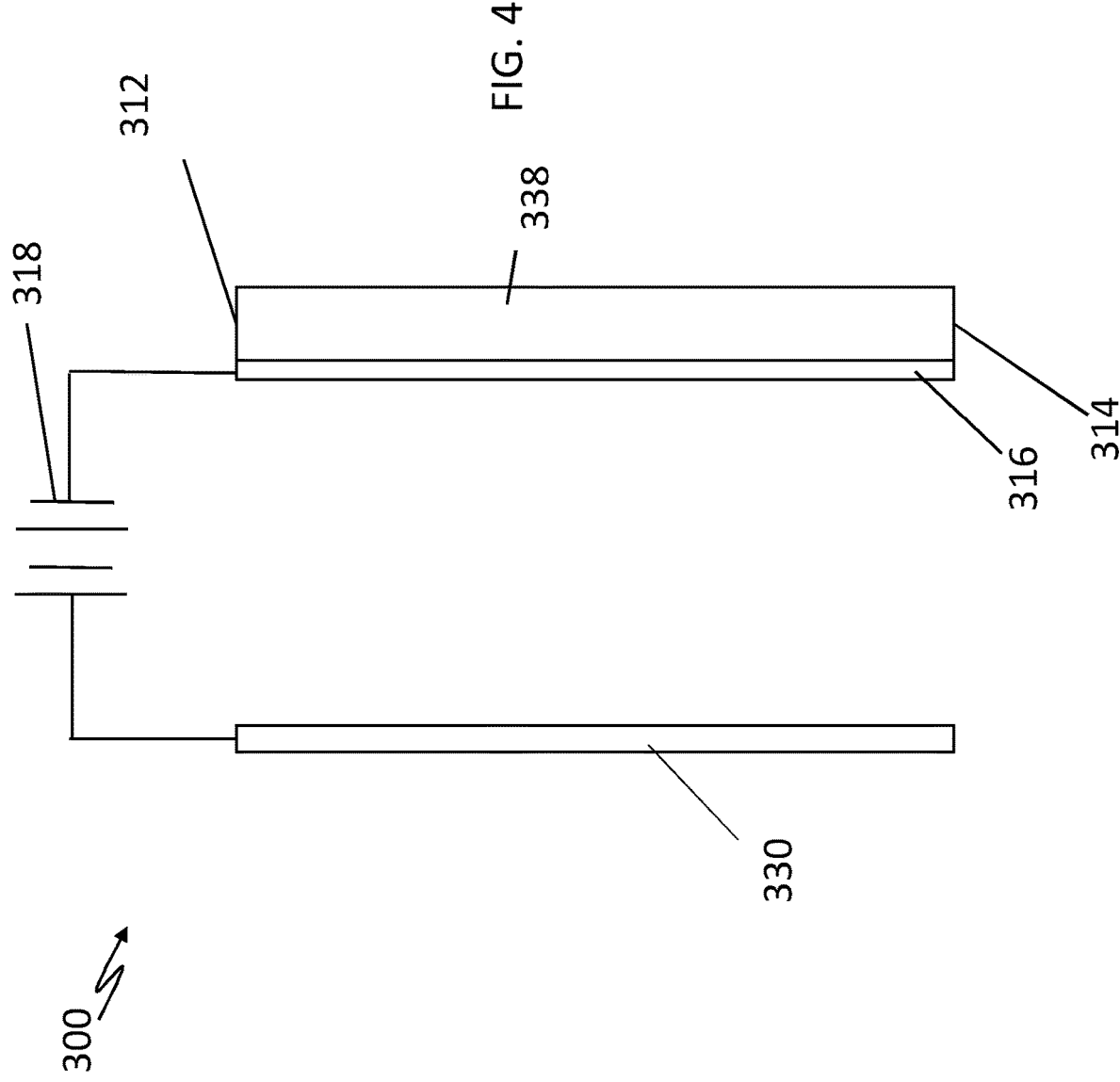

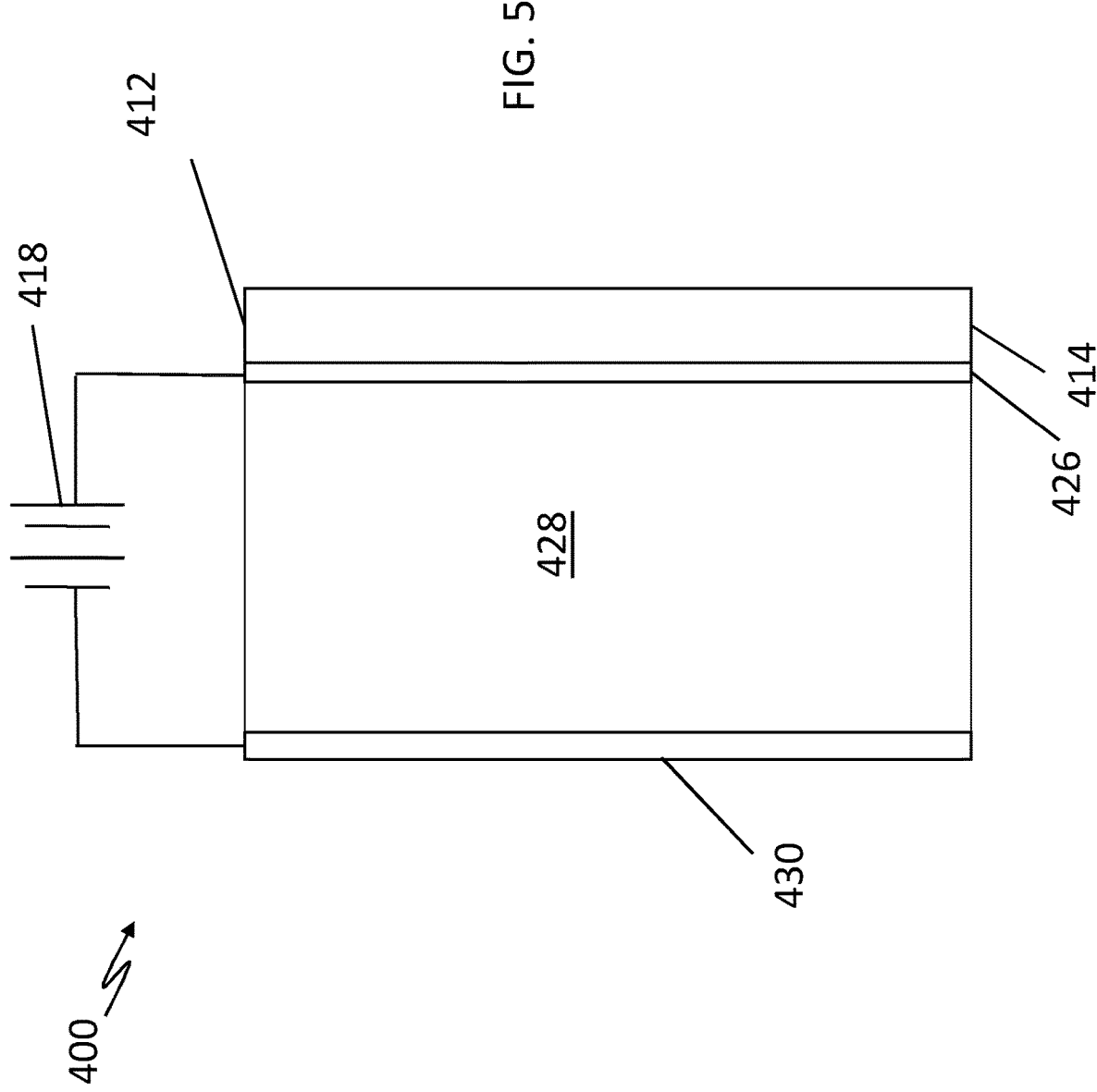

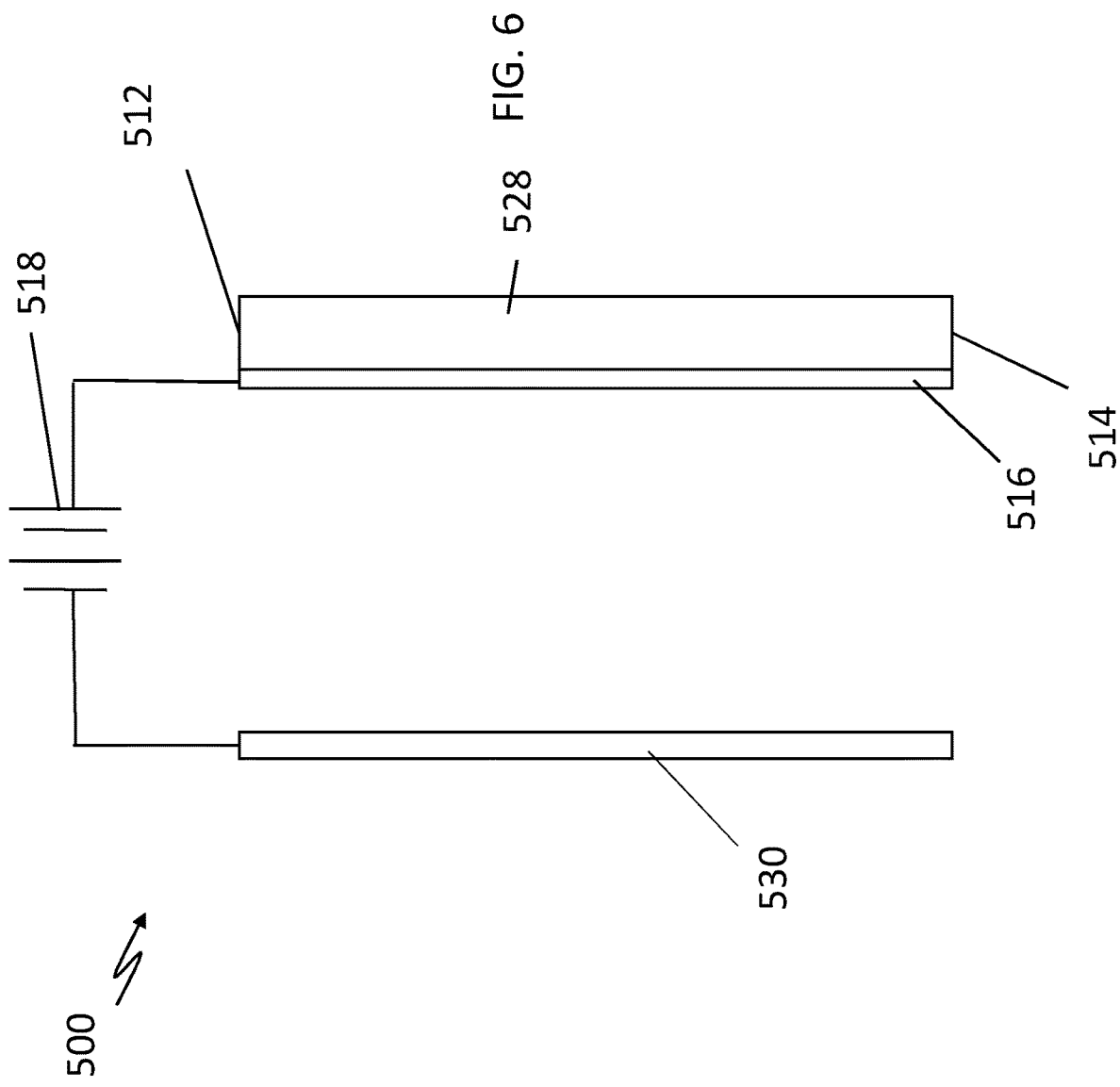

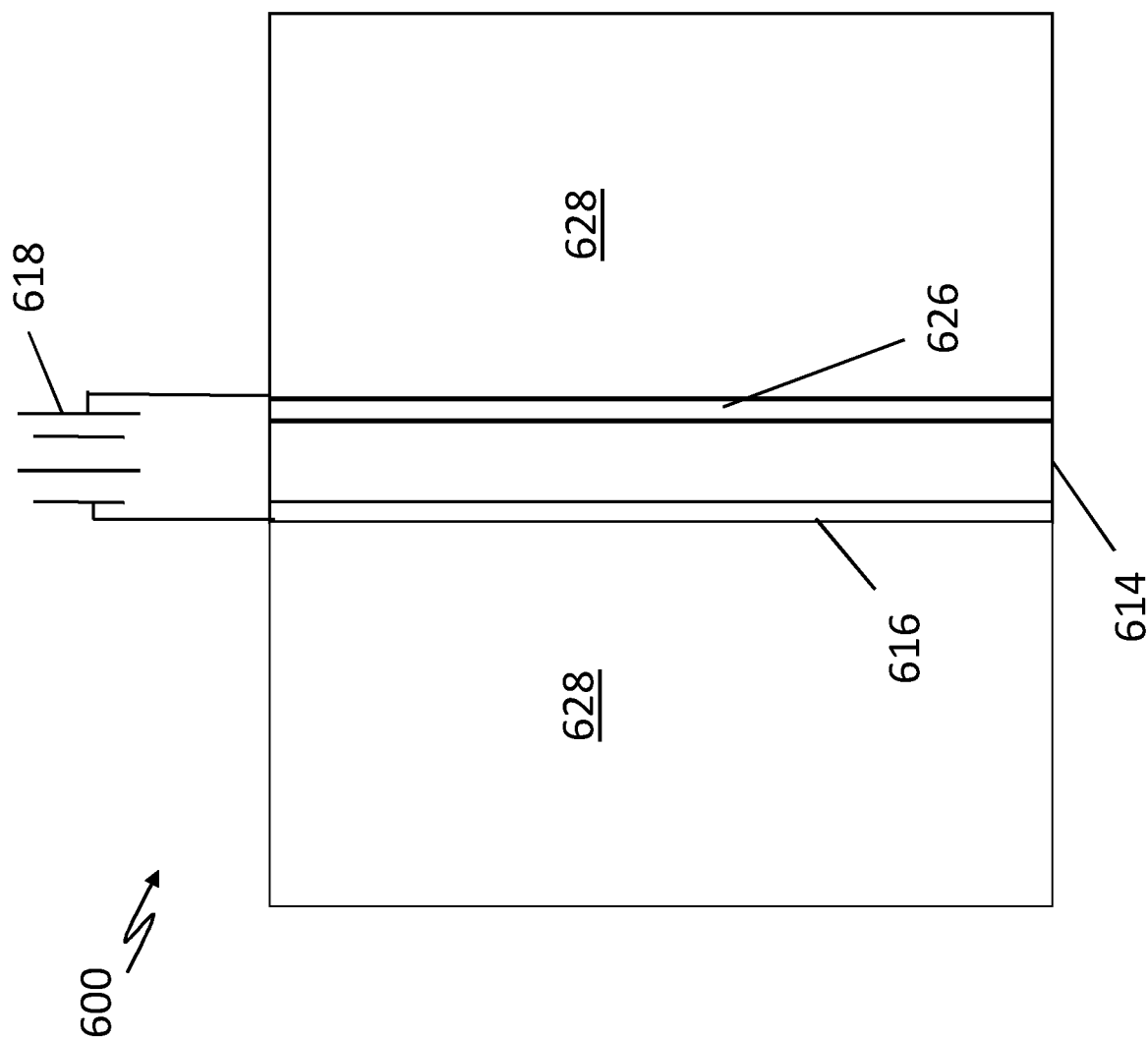

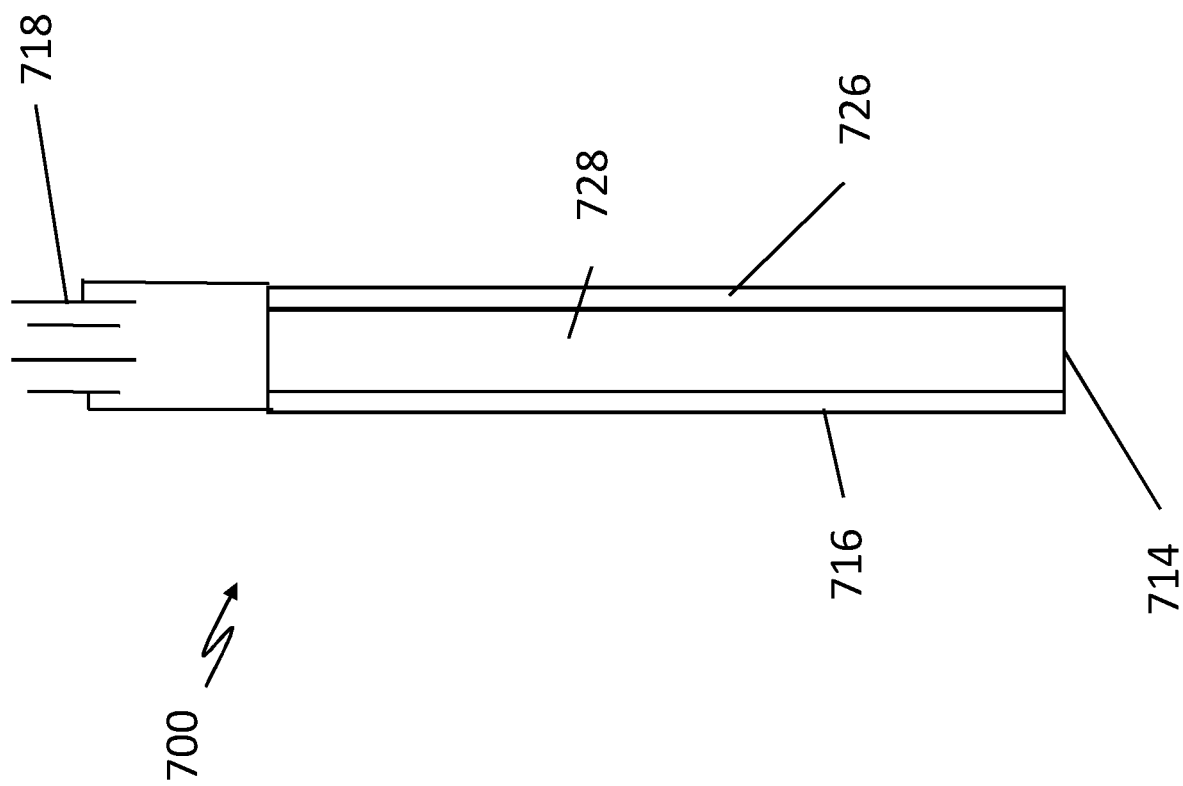

ELECTRO-CONTROLLABLE ION EXCHANGE MEMBRANE

CROSS-REFERENCE TO RELATED APPLICATIONS

The present application claims priority to U.S. Provisional No. 62/608,179, filed on Dec. 20, 2017.

BACKGROUND OF THE INVENTION

1. Field of the Invention

The present invention relates to ion exchange membranes and, more particularly, to a conductive nanoporous membrane with a switchable surface charge.

2. Description of the Related Art

Ion exchange membranes transport dissolved ions across a conductive polymeric membrane. The membranes are often used in desalination and chemical recovery applications, moving ions from one solution to another with little passage of water. Conventional ion exchange membranes are made of a polymeric material that is attached to charged ion groups. Anion exchange membranes contain fixed cationic groups with predominantly mobile anions and cation exchange membranes contain fixed anionic groups with predominantly mobile cations. The problem with these approaches, however, is the membrane is predetermined as either an anion or a cation exchange membrane. As a result, membrane regeneration is complicated and involves wasted materials and energy. Accordingly, there is a need in the art for a single system that can be easily controlled to act as either an anion or a cation exchange membrane as desired.

BRIEF SUMMARY OF THE INVENTION

The present invention is a conductive nanoporous membrane system that can be easily controlled to act as either an anion or a cation exchange membrane as desired. The system comprises a first ion exchange membrane formed from a first substrate and a first conductive layer applied to the first substrate so that the first ion exchange membrane is conductive. The system also comprises a second ion exchange membrane formed from a second substrate and a second conductive layer applied to the second substrate so that the second ion exchange membrane is conductive. The system further comprises an electrolyte associated with at least one of the first ion exchange membrane and the second ion exchange membrane. The system additionally comprises a voltage source coupled to the first ion exchange membrane and the second ion exchange membrane so that one of the first ion exchange membrane and the second ion exchange membrane acts as an anion exchange member and the other of the first ion exchange membrane and the second ion exchange membrane acts as a cation exchange membrane. The electrolyte may be positioned between and in contact with the first ion exchange membrane and the second ion exchange membrane. The electrolyte may be saturated into at least one of the first ion exchange membrane and the second ion exchange membrane. The substrate may be formed from a composition selected from the group consisting of anodic aluminum oxide (AAO), polypyrrole, polyacetylene, polycarbonate (PCTE), polyethersulfone (PES), and polymer-carbon nanotubes. The conductive layer may be formed from a material selected from the group consisting of metal, carbon, and conductive polymer.

The present invention also includes a conductive nanoporous membrane system, comprised of a first ion exchange membrane formed from a first substrate and a first conductive layer applied to the first substrate so that the first ion exchange membrane is conductive, a conductive sheet, an electrolyte associated with at least one of the first ion exchange membrane and the conductive sheet, and a voltage source coupled to the first ion exchange membrane and the conductive sheet so that the first ion exchange membrane acts as one of an anion exchange member and a cation exchange membrane. The electrolyte may be positioned between and in contact with the first ion exchange membrane and the conductive sheet. The electrolyte may be saturated into the first ion exchange membrane. The first ion exchange membrane may be coupled to the voltage source to act as the anion exchange member. The first ion exchange membrane may be coupled to the voltage source to act as the cation exchange membrane. The substrate may be formed from a composition selected from the group consisting of anodic aluminum oxide (AAO), polypyrrole, polyacetylene, polycarbonate (PCTE), polyethersulfone (PES), and polymer-carbon nanotubes. The conductive layer may be formed from a material selected from the group consisting of metal, carbon, and conductive polymer.

The present invention further includes a conductive nanoporous membrane system comprised of an ion exchange membrane formed from a substrate having a first side and a second side, a first conductive layer applied to the first side of the substrate, and a second conductive layer applied to the second side of the substrate, an electrolyte associated with the first ion exchange membrane and the conductive sheet, and a voltage source coupled to the first conductive layer and the second conductive layer so that the ion exchange membrane acts as a bipolar membrane. The ion exchange membrane may be positioned in the electrolyte or the ion exchange membrane may be saturated with the electrolyte. The substrate may be formed from a composition selected from the group consisting of anodic aluminum oxide (AAO), polypyrrole, polyacetylene, polycarbonate (PCTE), polyethersulfone (PES), and polymer-carbon nanotubes. The conductive layer may be formed from a material selected from the group consisting of metal, carbon, and conductive polymer.

BRIEF DESCRIPTION OF THE SEVERAL VIEWS OF THE DRAWING(S)

The present invention will be more fully understood and appreciated by reading the following Detailed Description in conjunction with the accompanying drawings, in which:

FIG. 1 is a schematic of a nanoporous membrane system in a liquid electrolyte according to the present invention;

FIG. 2 is a schematic of a nanoporous membrane system that has been rinsed in a liquid electrolyte according to the present invention;

FIG. 3 is a schematic of another embodiment of a nanoporous membrane system in a liquid electrolyte according to the present invention;

FIG. 4 is a schematic of the embodiment of FIG. 3 that has been rinsed in a liquid electrolyte according to the present invention;

FIG. 5 is a schematic of a further embodiment of a nanoporous membrane system in a liquid electrolyte according to the present invention;

FIG. 6 is a schematic of the embodiment of FIG. 5 that has been rinsed in a liquid electrolyte according to the present invention;

FIG. 7 is a schematic of an embodiment of a bipolar nanoporous membrane system in a liquid electrolyte according to the present invention; and FIG. 8 is a schematic of the embodiment of FIG. 7 that has been rinsed in a liquid electrolyte according to the present invention.

DETAILED DESCRIPTION OF THE INVENTION

Referring to the figures, wherein like numeral refer to like parts throughout, there is seen in a FIG. 1 a conductive nanoporous membrane system 10 according to the present invention. The term "cation exchange membrane" as used in the instant disclosure means "cation conductive membrane," and the term "anion exchange membrane" as used in the instant disclosure means "anion conductive membrane."

System 10 comprises a first ion exchange membrane 12 formed from either a nanoporous substrate 14, such as anodic aluminum oxide (AAO), that has a coating 16 formed from a metal or carbon to form a conductive membrane, or a conductive polymeric membrane based on conductive polymers (e.g., polypyrrole, polyacetylene) or polymer-carbon nanotube (CNT) composites. The nanoporous substrate 14 may also comprise a polymeric membrane, e.g., a polycarbonate (PCTE) membrane, a polyethersulfone (PES) membrane, etc. The coating may comprise carbon or an inert metal (or combination thereof), such as platinum, gold, etc. or a conductive polymer. Accordingly, in the FIGS., references to a layer that is metal could equally refer to a metal, carbon, or even a conductive polymer layer. First ion exchange membrane 12 is coupled to a voltage source 18 to act as an anion exchange membrane (AEM). A second ion exchange membrane 22 that is also formed from a nanoporous substrate 24 having a coating 26 formed from a metal or carbon, or conductive polymers, to form a conductive membrane that is positioned in spaced relation to the first conductive membrane and coupled to the voltage source 18 to act as a cation exchange membrane (CEM). A liquid electrolyte 28 is positioned between the two conductive membranes to complete the system. Applying a voltage across the ion exchange membrane 12 and ion exchange membrane 22 (which may be less than 30V) makes ion exchange membrane 12 behave as an AEM, and ion exchange membrane 22 behave as CEM, because electrical double layers (EDL) form at the interface between the metal layers 16 and 26 and liquid electrolyte 28, and the EDL acts a barrier to counter ions.

Referring to FIG. 2, another embodiment of a conductive nanoporous membrane system 100 according to the present invention may be configured for use in applications where a liquid electrolyte does not exist, e.g., proton exchange membrane fuel cells. In this embodiment, ion exchange membrane 112 acting as the AEM and ion exchange membrane 122 acting as the CEM are first rinsed in liquid electrolyte 128 to saturate the nanopores and allow for the formation of an EDL so that membranes 112 and 122 block counter ions and can function.

Referring to FIG. 3, a further embodiment of a conductive nanoporous membrane system 200 may comprise a single ion exchange membrane 212 formed from a nanoporous substrate 214 coated with a layer 216 of metal or carbon (or conductive polymers) to form a conductive membrane that is spaced apart from sheet conductor 230 formed from a metal, carbon, or conductive polymer. A liquid electrolyte 228 is positioned between the single ion exchange membrane and the sheet conductor 230. In this embodiment, the positive charges are stored in sheet conductor 230 and ion exchange membrane 212 forming the CEM is negatively charged so that the CEM repulses anions because of its negative charge.

Referring to FIG. 4, a conductive nanoporous membrane system 300 may be formed from the embodiment of FIG. 3 that is configured for use in applications where a liquid electrolyte does not exist by rinsing ion exchange membrane 212 forming the CEM in an electrolyte to allow the formation of the EDL so that the CEM blocks anions and functions accordingly.

Referring to FIG. 5, a conductive nanoporous membrane system 400 may be formed from the embodiment of FIG. 3 with an ion exchange membrane 412 forming an AEM and a sheet conductor 430 in place of the CEM by reversing the polarity of the coupling to voltage source 418.

Referring to FIG. 6, a conductive nanoporous membrane system 500 based on the arrangement of FIG. 5 may also be configured for use in applications where a liquid electrolyte does not exist by rinsing the CEM in a liquid electrolyte 528 to allow the formation of the EDL so that the AEM blocks anions and functions accordingly.

Referring to FIG. 7, yet another conductive nanoporous membrane system 600 may comprise a single nanoporous substrate 614 that has a first metal coating 616 on one side and a second metal coating 626 on the other side, thereby forming a bipolar membrane. First metal coating 616 and second metal coating 626 are each coupled to opposite poles of a voltage source 618 to apply a voltage across first metal coating 616 and second metal coating 626 with the entire assembly of nanoporous substrate 614 and metal coatings 616 and 626 placed in a liquid electrolyte 628. The positive electrode behaves as an AEM, and the negative electrode behaves as a CEM. Thus, the AEM and the CEM coexist on the same membrane and may therefore be referred to as a bipolar membrane. The bipolar membrane formed from first metal coating 616 and second metal coating 626 will dissociate $H_2O$ into $H+$ and $OH-$, and may be used to produce an acid and a base from a corresponding salt in combination with a conventional monopolar ion exchange membrane.

Referring to FIG. 8, conductive nanoporous membrane system 600 of FIG. 7 may be configured for use in an application where a liquid electrolyte does not exist by rinsing a bipolar membrane formed by a single nanoporous substrate 714 that has a first metal coating 716 on one side and a second metal coating 726 on the other in an electrolyte 728 so that the single nanoporous substrate 717 is saturated with electrolyte 728 and can function.

The present invention thus comprises an ion exchange membrane formed from a conductive nanoporous membrane having a voltage applied across the membrane. The conductivity of the membrane is created by a conductive polymeric membrane or using a metal or carbon or conductive polymers coating on single side or both sides of a nanoporous structure. The membrane can have either a positive or a negative surface charge by applying either a positive or negative voltage. The surface charge density is large due to the formation of an electrical double layer between solution and membrane. Positively charged membranes act as anion exchange membranes, and negatively charged membranes act as cation exchange membranes. The surface charge of conventional membranes is determined by the ionic property of the material, but the present invention utilizes capacitive charging to load static charges on the membrane, and the amount of charge is controllable. Furthermore, more charges may be loaded than that of conventional membranes to achieve higher ionic selectivity. In addition, adopting non-porous structures reduces the water and counter-ionic resistance of the membrane and attains higher counter-ionic conductivity, so the passing of counter ions is more efficient than that of conventional membranes; also, the lower water resistance reduces the required hydraulic pressure for desalination and improves the energy efficiency.

The present invention provides for electrical control over the polarity of the membrane, so it is possible to switch the polarity immediately without changing the membrane. As a result, the present invention provides an easy way to accomplish membrane regeneration. This functionality is particularly useful in some applications, such as desalination systems using reversed electrodialysis, where the electrode systems need to be regenerated by swapping the salt water inlet and the fresh water inlet. The present invention allows for swapping of the membrane simply be reversing the polarity of the voltage across the membrane.

Unlike the surface charge of conventional membranes that are determined by the ionic property of the material, the present invention utilizes capacitive charging to load static charges on the membrane, and the amount of charge is controllable and greater than that of conventional membranes to achieve higher ionic selectivity. The present invention is thus applicable to desalination, electrodialysis, reversed electrodialysis, acid and base production, fuel cells, redox flow batteries, and electrodeionization.

What is claimed is:

1. A conductive nanoporous membrane system, comprising
a first ion conductive membrane that is nanoporous and formed from a first nanoporous substrate having nanopores with a diameter of 1000 nm or less and a first electrically conductive layer of a first material applied to the first nanoporous substrate so that a first surface charge will form on the first ion conductive membrane;
a second ion conductive membrane that is nanoporous and formed from a second nanoporous substrate having nanopores with a diameter of 1000 nm or less and a second electrically conductive layer of a second material applied to the second substrate so that a second surface charge will form on the second ion conductive membrane, wherein the first material and the second material are the same;
an electrolyte in contact with at least one of the first electrically conductive layer of the first ion conductive membrane and the second electrically conductive layer of the second ion conductive membrane; and
a voltage source coupled to the first ion conductive membrane and the second ion conductive membrane so that one of the first ion conductive membrane and the second ion conductive membrane acts as an anion conductive membrane and the other of the first ion conductive membrane and the second ion conductive membrane acts as a cation conductive membrane in response to a voltage applied across the first ion conductive membrane and the second ion conductive membrane by the voltage source.

2. The conductive nanoporous membrane system of claim 1, wherein the electrolyte is positioned between and in contact with the first ion conductive membrane and the second ion conductive membrane.

3. The conductive nanoporous membrane system of claim 1, wherein the electrolyte is saturated into at least one of the first ion conductive membrane and the second ion conductive membrane.

4. The conductive nanoporous membrane system of claim 1, wherein the first substrate is formed from a composition selected from the group consisting of anodic aluminum oxide (AAO), polypyrrole, polyacetylene, polycarbonate (PCTE), polyethersulfone (PES), and polymer-carbon nanotubes and the second substrate is formed from a composition selected from the group consisting of anodic aluminum oxide (AAO), polypyrrole, polyacetylene, polycarbonate (PCTE), polyethersulfone (PES), and polymer-carbon nanotubes.

5. The conductive nanoporous membrane system of claim 1, wherein the first conductive layer is formed from a material selected from the group consisting of metal, carbon, and conductive polymer and the second conductive layer is formed from a material selected from the group consisting of metal, carbon, and conductive polymer.

6. A conductive nanoporous membrane system, comprising
a first ion conductive membrane that is nanoporous and formed from a first substrate and a first conductive layer of a first material applied to the first substrate so that a first surface charge will form on the first ion conductive membrane;
a conductive sheet formed from a second material that is the same as the first material;
an electrolyte in contact with at least one of the first conductive layer of the first ion conductive membrane and the conductive sheet; and
a voltage source coupled to the first ion conductive membrane and the conductive sheet such that the first ion conductive membrane acts as one of an anion conductive membrane and a cation conductive membrane in response to a polarity of a voltage applied across the first ion conductive membrane by the voltage source.

7. The conductive nanoporous membrane system of claim 6, wherein the electrolyte is positioned between and in contact with the first ion conductive membrane and the conductive sheet.

8. The conductive nanoporous membrane system of claim 6, wherein the electrolyte is saturated into the first ion conductive membrane.

9. The conductive nanoporous membrane system of claim 6, wherein the first ion conductive membrane is coupled to the voltage source to act as the anion conductive membrane.

10. The conductive nanoporous membrane system of claim 6, wherein the first ion conductive membrane is coupled to the voltage source to act as the cation conductive membrane.

11. The conductive nanoporous membrane system of claim 6, wherein the first substrate is formed from a composition selected from the group consisting of anodic aluminum oxide (AAO), polypyrrole, polyacetylene, polycarbonate (PCTE), polyethersulfone (PES), and polymer-carbon nanotubes.

12. The conductive nanoporous membrane system of claim 6, wherein the first conductive layer is formed from a material selected from the group consisting of metal, carbon, and conductive polymer.

* * * * *